F. M. EDMONDS & R. J. GOODNOW.
GASOLENE MEASURING RULE.
APPLICATION FILED NOV. 3, 1910.

1,019,442.

Patented Mar. 5, 1912.

WITNESSES:
M. E. Flaherty,
George Langton

INVENTORS
Frank M. Edmonds
Russell J. Goodnow
By
their attorneys.

UNITED STATES PATENT OFFICE.

FRANK M. EDMONDS AND RUSSELL J. GOODNOW, OF BOSTON, MASSACHUSETTS; SAID EDMONDS ASSIGNOR TO SAID GOODNOW.

GASOLENE-MEASURING RULE.

1,019,442.     Specification of Letters Patent.     Patented Mar. 5, 1912.

Application filed November 3, 1910. Serial No. 590,433.

*To all whom it may concern:*

Be it known that we, FRANK M. EDMONDS and RUSSELL J. GOODNOW, both of Boston, in the county of Suffolk and State of Massachusetts, citizens of the United States, have invented a new and useful Improvement in Gasolene-Measuring Rules, of which the following is a specification.

Our invention is intended for use in measuring the amount of gasolene or other liquid in a tank and is especially intended for use with the gasolene tank of an automobile. Such tanks are irregular in shape so that the increase or decrease in the depth of the gasolene does not necessarily show the number of gallons which have been added to the contents or have been used. It is very common to determine in a general way whether a tank contains gasolene enough for a given trip by taking a stick and measuring the depth of the gasolene and guessing as to whether there is gasolene enough in the tank or not. The practical difficulty with this is that one is apt to rely on one's memory and at the critical time— the beginning of the return trip—forget the depth of gasolene at the beginning of the trip, so that the measurement by a stick is ineffective.

Our invention is intended to provide on the one measure an indication of the depth of the tank, gallon by gallon, and also to provide an indication of the depth at any particular time, and our invention will be understood by reference to the drawings, in which—

Figure 2:
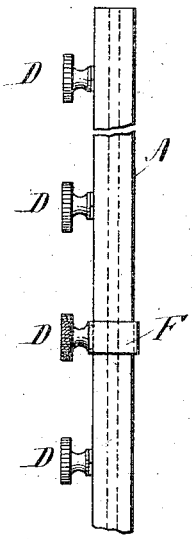
Figure 3:
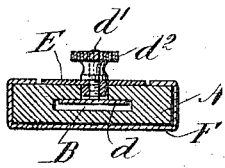
Figure 4:
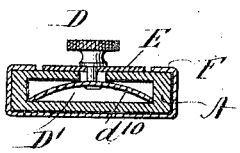
Figure 1:
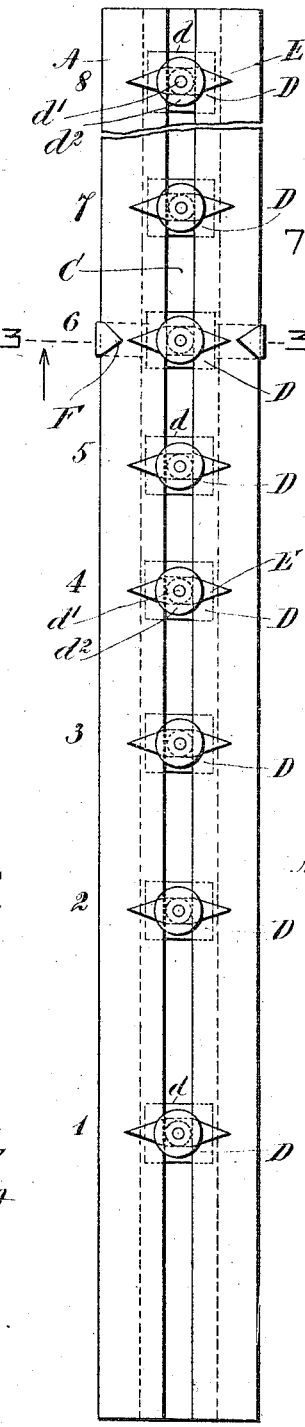
Figures 5, 6:
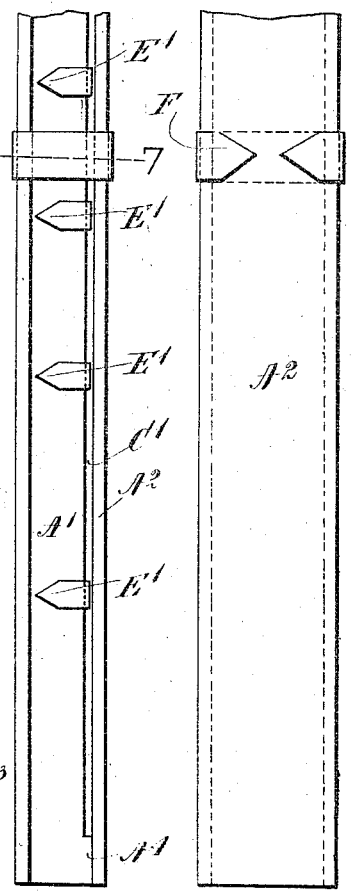
Figure 7:
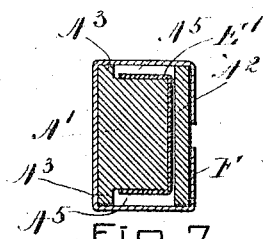

Figure 1 represents the preferred form of our invention, Fig. 2 being a side view and Fig. 3 being a section on line 3—3 of Fig. 1. Fig. 4 shows one modification in cross section. Figs. 5 and 6 are side and back views, respectively, of another modification of our invention. Fig. 7 is a section on the line 7—7, Fig. 5.

In Figs. 1, 2, 5 and 6 portions only of the measure are shown to indicate that the measure may be of any desired length. Enough, however, of each form of measure shown is given to indicate the principle on which it is constructed.

Turning to the form of our invention shown in Figs. 1, 2 and 3, A is a measure which is preferably made of wood but may be of metal or other material unaffected by gasolene or the liquid to be measured. In cross section, as seen in Fig. 3, it is shown that the measure is provided with a channel B and a slot C both of which run the full length of the measure and connect with each other. In the slot C and channel B run pointers D. Each pointer (of which there are a number corresponding to the number of gallons or other units to be measured by the rod) consists of a plate $d$ having a short screw pin $d^1$ which projects through the slot C to receive a thumb nut $d^2$. A pointer E provided with a suitable hole to fit over the screw pin $d^1$, rests on the top of the measure A under the thumb nut C. The pointer E may therefore be brought to any point along the line of the slot and there clamped by the thumb nut $d^2$. In addition to these features we also provide a marker F which does not necessarily have a clamp screw, being in fact preferably slidable along the measure but clamping the measure sufficiently tightly to require considerable strength to move it.

Each measure is intended to be used with its own tank, that is to say, a person having more than one tank will have an equal number of measures, and to use the measure in the manner in which we intend he pours into his empty tank a gallon or other unit of liquid and puts his measure through the inlet opening and rests it on the bottom of the tank. On withdrawing the measure the liquid will leave its mark thereon and so indicate the depth of one gallon of liquid in the tank. He will then set and clamp the first pointer 1 at that point. He then pours in another gallon of liquid and repeats the operation, using this time the second pointer 2, and so on until his tank is full. The pointers all being thus clamped in place serve as a measure on all occasions for the contents of that particular tank.

It is well known that a gasolene tank of an automobile is sometimes concave in the bottom or convex or irregular in shape as to its vertical walls or otherwise irregular in shape, so that it is not unusual when the operation is finished to find one's measure arranged somewhat as shown in Fig. 1 where the distance from the pointer 1 to the bottom of the measure indicates the depth of one gallon. From 2 to the bottom of the measure indicates two gallons although the distance between 1 and 2 is less than the distance of 1 to the bottom of the measure. The pointer 3 in the same way indicates three gallons and 4 four gallons, etc., these pointers, however, being often at irregular distances apart. Suppose now the user of the automobile is about to start on a trip and wants to be able to tell how his gasolene will hold out. He drops his measure into his tank and finds that the depth is measured by the pointer 6. He then places the marker F at that point and thus has a record that he had six gallons when he started for there his marker F remains until he changes it. After he has ridden a certain number of hours and realizes that he has perhaps an hour more to ride before reaching his destination and that his gasolene must be getting low, he drops his measure into the tank as before and finds that he has one gallon left. In other words, he has used five gallons during the period of time in which he has been riding. He can then judge whether he has gasolene enough to take him to his destination without relying on his memory.

In the form of our invention shown in Fig. 4 the general structure is the same except that in this case the channel $B^1$ is somewhat deeper than in the form shown in Fig. 3 and the plate $d^{10}$ is a spring plate, this making it a little more difficult to adjust the marker F although it is done in the same way as in Fig. 1.

In the form of our invention shown in Figs. 5, 6 and 7 the measure comprises two parts $A^1$, $A^2$. The portion $A^1$ is provided with a flange $A^3$ on each side, forming a recess $A^5$ in which slides the pointer $E^1$. The part $A^2$ is attached at each end to a projection $A^4$ at each end of the part $A^1$ so as to leave a slot $C^1$ and allow the sliding of the pointers $E^1$ and yet serve as a protection to them so that they will not be moved accidentally. A slot is thus formed at $C^1$ through which the pointers may be slid to their required position. These pointers are used in the same way as the pointers in Fig. 1, but they rely upon their protected condition between the flange $A^3$ and the piece $A^2$ and their own shape to keep them in place. A marker F is also provided like that shown in the other figures, which, however, slides around the entire outside of the measure as in the former case so as not to interfere in its movements with the pointers $E^1$.

We have shown these various forms to indicate that we do not mean to limit ourselves to any special form of measure. The measure may be of any construction desired.

There are other ways in which our invention may be embodied but those shown are very simple and economical to make. The marker F may be omitted if thought best.

What we claim as our invention is:—

The measure above described comprising a rod having a series of pointers slidable thereon whereby they may be adjusted according to the number of units which each is to measure, in combination with a marker consisting of an elastic member embracing said rod and also slidable thereon without interfering with said pointers, whereby the depth of liquid at any one time may be measured and marked, and the depths at other times measured.

FRANK M. EDMONDS.
RUSSELL J. GOODNOW.

Witnesses:
M. E. FLAHERTY,
GEORGE LANGTON.